United States Patent
Sato et al.

[11] Patent Number: 5,963,288
[45] Date of Patent: *Oct. 5, 1999

[54] LIQUID CRYSTAL DEVICE HAVING SEALANT AND SPACERS MADE FROM THE SAME MATERIAL

[75] Inventors: Masahiko Sato; Toshimitsu Konuma, both of Atsugi; Seiichi Odaka, Kisakata-machi; Toshiharu Yamaguchi, Zama; Toshio Watanabe, Atsugi; Osamu Aoyagi, Atsugi; Kaoru Tabata, Atsugi; Chizuru Isigaki, Atsugi; Hiroyuki Sakayori, Machida; Ippei Kobayashi; Akio Osabe, both of Atsugi; Shunpei Yamazaki, Tokyo, all of Japan

[73] Assignee: Semiconductor Energy Laboratory Co., Ltd., Kanagawa-ken, Japan

[ * ] Notice: This patent is subject to a terminal disclaimer.

[21] Appl. No.: 08/470,618

[22] Filed: Jun. 6, 1995

Related U.S. Application Data

[62] Division of application No. 08/314,618, Sep. 29, 1994, abandoned, which is a division of application No. 07/908,756, Jul. 6, 1992, Pat. No. 5,379,139, which is a continuation of application No. 07/440,422, Nov. 20, 1989, abandoned, which is a continuation-in-part of application No. 07/087,275, Aug. 20, 1987, abandoned.

[51] Int. Cl.$^6$ .................................................. G02F 1/25
[52] U.S. Cl. .......................... 349/154; 349/155; 349/156; 349/157; 349/164
[58] Field of Search ................................. 359/81, 82, 59; 349/154–157, 164

[56] References Cited

U.S. PATENT DOCUMENTS

| | | | |
|---|---|---|---|
| 3,863,332 | 2/1975 | Leupp et al. | 29/580 |
| 4,165,157 | 8/1979 | Kobale et al. | 359/81 |
| 4,165,800 | 8/1979 | Kobale et al. | 359/81 |
| 4,188,095 | 2/1980 | Nishimura et al. | 350/357 |
| 4,222,635 | 9/1980 | Jülke | 350/320 |
| 4,249,800 | 2/1981 | Spruijt | 359/81 |
| 4,401,537 | 8/1983 | Chern et al. | 204/159.11 |
| 4,416,515 | 11/1983 | Funada et al. | 349/164 |
| 4,425,029 | 1/1984 | Funada et al. | 349/164 |
| 4,556,287 | 12/1985 | Funada et al. | 350/336 |
| 4,609,427 | 9/1986 | Inamoto et al. | 156/633 |
| 4,674,839 | 6/1987 | Tsuboyama et al. | 350/334 |
| 4,698,176 | 10/1987 | Gray et al. | 359/103 |
| 4,740,700 | 4/1988 | Shaham et al. | 250/332 |
| 4,744,639 | 5/1988 | Tsuboyama | 359/81 |
| 4,775,225 | 10/1988 | Tsuboyama et al. | 359/81 |
| 4,874,461 | 10/1989 | Sato et al. | 156/633 |
| 4,989,955 | 2/1991 | Ito et al. | 349/157 |
| 5,379,139 | 1/1995 | Sato et al. | 359/81 |
| 5,654,784 | 8/1997 | Yasuda et al. | 349/172 |

FOREIGN PATENT DOCUMENTS

| | | | |
|---|---|---|---|
| 3510661 | of 1985 | Germany | 350/344 |
| 61-184518 | of 0000 | Japan . | |
| 0107754 | 8/1979 | Japan | 359/81 |
| 0017923 | of 1982 | Japan | 359/81 |
| 0102922 | of 1983 | Japan | 359/81 |
| 0084220 | of 1984 | Japan | 350/343 |
| 0006982 | of 1985 | Japan | 350/344 |
| 0021027 | of 1985 | Japan | 359/81 |
| 0101920 | of 1985 | Japan | 359/81 |
| 61-7822 | 1/1986 | Japan | G02F 1/133 |
| 61-173222 | 8/1986 | Japan | G02F 1/133 |
| 0086331 | of 1987 | Japan | 350/344 |
| 0008128 | 1/1987 | Japan | 359/81 |
| 0094321 | of 1989 | Japan | 359/81 |

*Primary Examiner*—Fetsum Abraham
*Attorney, Agent, or Firm*—Sixbey, Friedman, Leedom & Ferguson, P.C; Eric J. Robinson

[57] ABSTRACT

An improved liquid crystal device and manufacturing method for same are described. In the device, a pair of substrates, between which a liquid crystal layer is disposed, is joined with pillars inbetween functioning as spacers which are provided of photocurable resin by photolithography. With this stucture, the spacers can be in surface contact with the inside surfaces of the substrates on which electrode arrangement and active devices are formed.

30 Claims, 4 Drawing Sheets

LIQUID CRYSTAL DEVICE HAVING SEALANT AND SPACERS MADE FROM THE SAME MATERIAL

This is a Divisional application of Ser. No. 08/314,618, filed Sep. 29, 1994, now abandoned, which itself is a divisional application of Ser. No. 07/908,756, filed Jul. 6, 1992 now U.S. Pat. No. 5,379,139; which itself is a continuation of Ser. No. 07/440,422, filed Nov. 20, 1989, now abandoned; which itself is a continuation-in-part of Ser. No. 07/087,275, filed Aug. 20, 1987, now abandoned.

BACKGROUND OF THE INVENTION

The present invention relates to a liquid crystal device and a method for manufacturing same.

A prior art photoelectric device with liquid crystal is illustrated in FIG. 1. The device, such as a liquid crystal display, comprises a pair of substrates 1 and 1' joined to each other with a suitable distance inbetween, a liquid crystal layer 5 disposed between the pair of substrates 1 and 1', opposed electrodes 2 and 2' formed on the opposed inside surfaces of the substrates 1 and 1' in the form of a matrix, and oriented coating 3 and 3' on the opposed insides contiguous to the liquid crystal layer 5. By virtue of application of a voltage to the electrodes 2 and 2', the optical characteristics of the liquid crystal 5 is changed under the electric field induced by the applied voltage. Namely, the device can be controlled by applying a voltage selectively to each pixel of the matrix to display an image or picture or storing information in terms of encoded signals.

The distance between the opposed substrates 1 and 1' is about 10 microns, while devices with the distance of 5 microns are now being developed. Although devices having twisted nematic liquid crystal can be constructed with the distances of this scale, the distance is demanded to be decreased to less than 3 microns, generally 2±0.5 microns, when making use of a ferroelectric liquid crystal for the device in place of a nematic liquid crystal.

Conventionally, the distance has been kept by disposing spacers 7 and 4 between the pair of substrates 1 and 1'. In the figure, two kinds of spacers are illustrated; one being mixed with a sealing member 6 and the other being disposed between the opposed electrodes 2 and 2'. For example, the spacers 4 are a plurality of spherical particles made of an organic resin such as Micro Pearl SP-210 having the average diameter of 10.0±0.5 microns made of a bridged polymer of divinyl benzene. The spacers of Micro Pearl SP-210 are perfect spheres. The spacers 4 prevent the substrates 1 and 1' from contact due to unevenness of the substrates or due to external stress.

However, the spacers 4 and the electrodes 2 and 2' are in point contact so that the electrodes 2 and 2' are subjected to concentrated stress. In cases where active devices are provided near the electrode 2 and 2', the concentrated stress may destroy the active devices or disconnect electrode circuits, and therefore make the liquid device defective. Further, even with the spacers 7 and 4, it is very difficult to obtain a constant distance between the substrates because the spacers, when distributed between the substrates, tend to aggregate to local positions on the substrates and because the diameters of spacers are not constant. Even if uniform distribution of the spacers is obtained between the substrates, the distribution is disturbed during filling process of liquid crystal. Especially, when a ferroelectric liquid crystal is disposed between the substrates with 3 microns or less in distance, the liquid crystal is charged into the distance by virtue of capillary action from an opening provided on a portion of sealed-off perimeter of the substrates in the manner that the entrance is dipped in an amount of liquid crystal in a vacuum condition and then the pressure is increased so that the liquid crystal is caused to enter the device through the opening by the differential pressure. So, the stream of the liquid crystal tends to move the distributed spacers. Because of this unevenness of the distance, color shade appears on a display with a ferroelectric liquid crystal which utilizes birefringence. The defect can appear only due to external stress, such as pushing with a finger.

SUMMARY OF THE INVENTION

It is therefore an object of the present invention to provide a liquid crystal device with no color shade.

It is another object of the present invention to provide a method for manufacturing a liquid crystal device at high yield.

It is further object of the present invention to provide a liquid crystal device having resistance against external impact.

It is still further object of the present invention to provide a method for manufacturing a liquid crystal device at a low cost.

It is yet still further object of the present invention to provide a facilitated method for manufacturing a liquid crystal device.

DETAILED DESCRIPTION OF THE PREFERRED EMBODIMENTS

Figure 1:
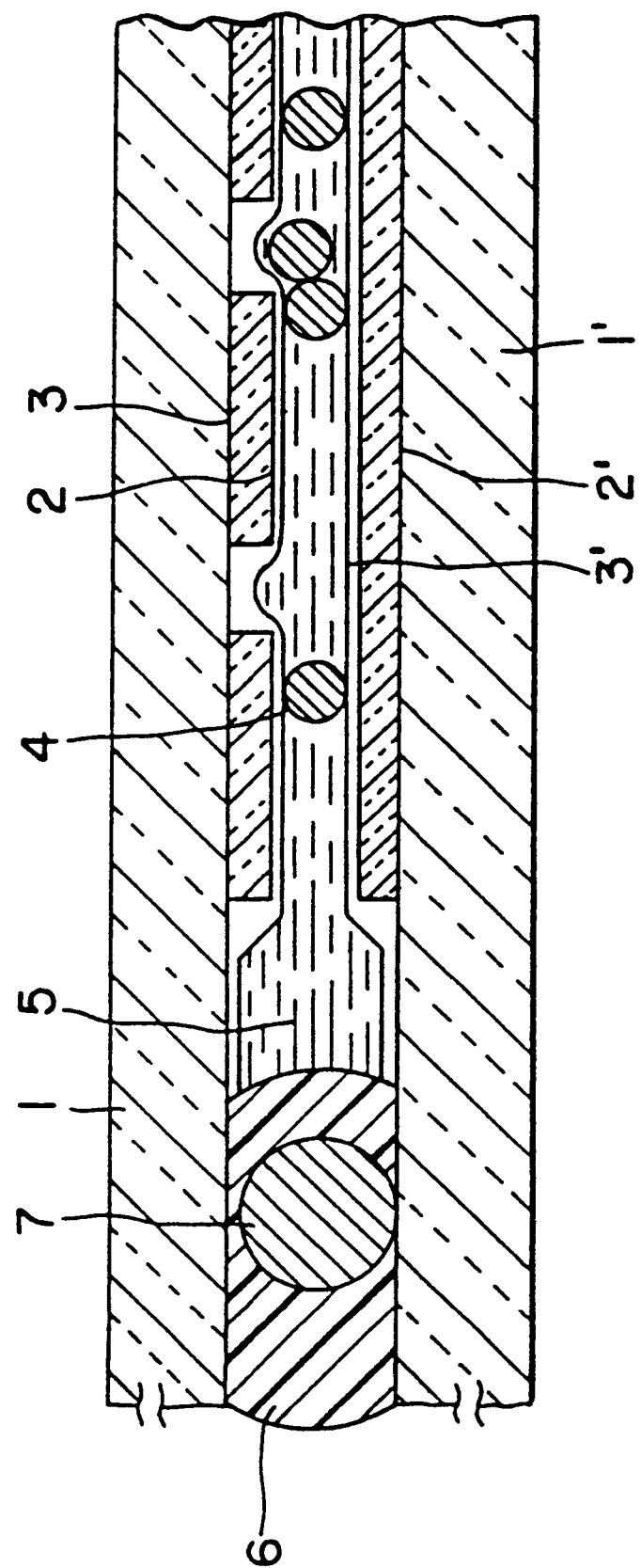
FIG. 1 is a cross section view showing a prior art liquid crystal device.
Figure 2A:
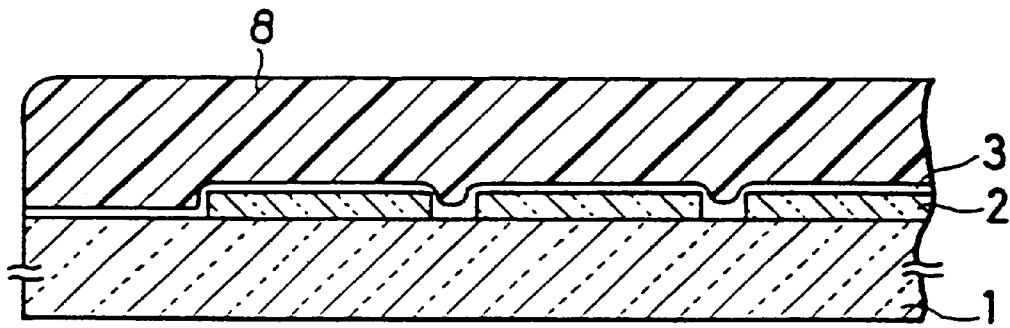
FIGS. 2(A) to 2(C) are cross section views showing a process for making a liquid crystal device in accordance with the present invention.
Figure 2B:
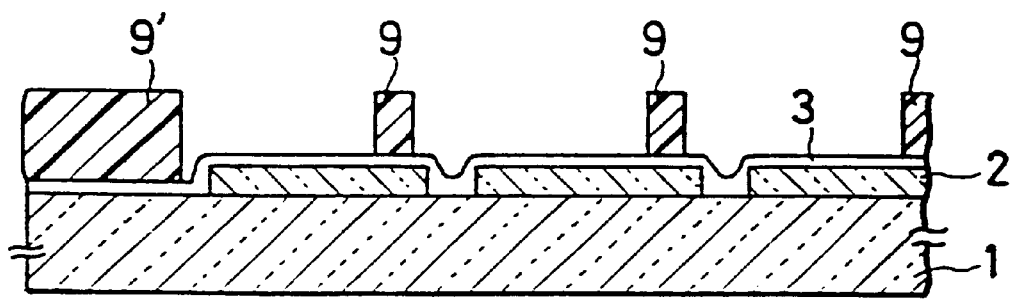
Figure 2C:
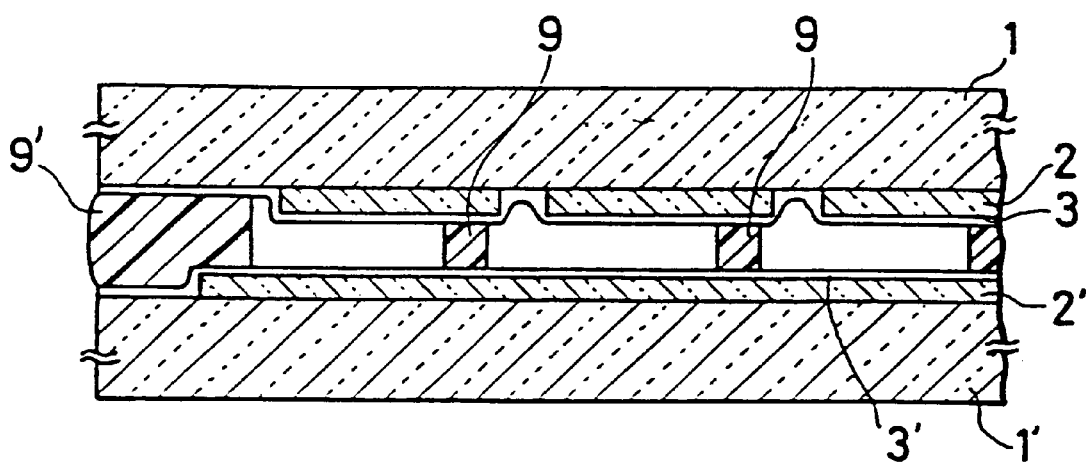

Referring now to FIGS. 2(A) to 2(C), the process for making a liquid crystal device in accordance with the present invention is described. In FIG. 2(A), the upper surface of a glass substrate 1 is provided with a plurality of first electrode strips 2 made of conductive transparent oxide such as indium tin oxide, $SnO_2$ or the like and elongated in the direction normal to the drawing. The surface is coated with a 500 Å thick oriented thin film 3 made of a polyimide over the first electrode strips. The oriented film is treated by rubbing. The surface is further coated with an adhesive solution of an epoxy resin, e.g., "UV-307" distributed from Grace Japan Ltd., curable both by ultraviolet light and by thermal energy. The epoxy resin 8 is applied by a spinner, a roll coater or a spray, or by screen press printing to the thickness of about 20 microns which can be controlled depending on the diameter of spacers. For example, the resin is applied to the surface by turning the substrate for 30 minutes at 3000 rpm.

The epoxy resin layer 8 is exposed to ultraviolet light (10 $mW/cm^2$) through a mask. The mask eliminates a portion of the ultraviolet light by photolithography, corresponding to the peripheral portion of the substrate and a plurality of pillars 9 (FIG. 2(B)). The peripheral portion is to be a sealing member 9' and can be formed with an opening for charging a liquid crystal. The pillars 9 on the electrode strip 2 have a cross section of 20 microns×20 microns respectively with intervals of 400 microns inbetween. The uncured portion of the resin layer 8 is removed by a solvent such as acetone, methylethylketone, or the like, and the remaining solvent on the substrate is blown away. The substrate provided with the sealing resin layer 9' and the pillars 9 is mated in a vacuum with an opposed substrate 1' which is provided with a plurality of second transparent electrode strips elongated in the direction perpendicular to the first electrode strips 2 as shown in FIG. 2(C). FIG. 2(C) is illustrated reversed in relation to FIGS. 2(A) and 2(B). The mated substrates 1 and 1' are fixed by baking at 150° C. for an hour under pressure applied from both external sides of the mated surface. By this postbaking, the thickness is reduced to less than 3 microns, e.g., 2±0.5 microns, which is suitable for a ferroelectric liquid crystal device. In this connection, when at least one substrate is comprised of glass having a thickness of no more than 0.1 mm and has some flexibility, the distance between the substrates is kept constant even if the substrate is slightly warped because the pillars having a same height urge the substrates to compensate each other. Between the mated substrates, a ferroelectric liquid crystal is disposed by an existing method.

Figure 3:
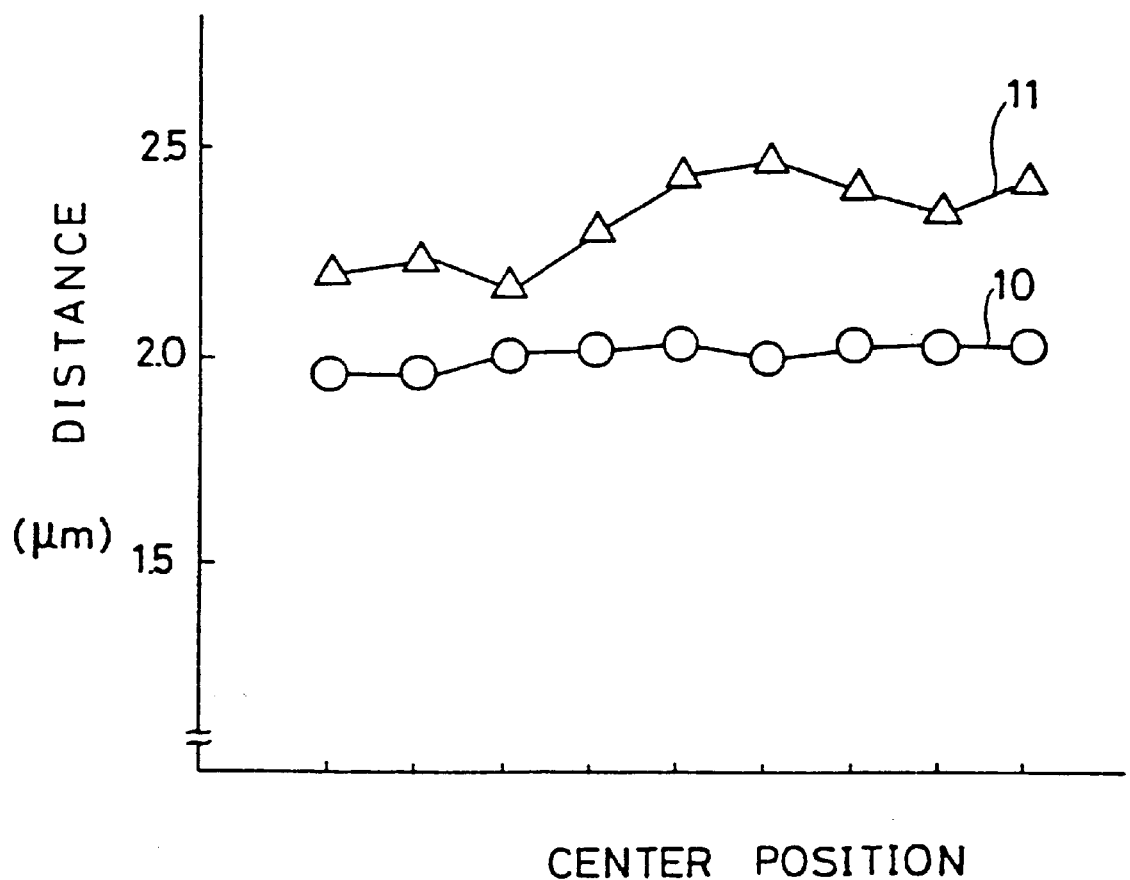
FIG. 3 is a graphical diagram showing, in relation to the position of the substrate, the distances between pairs of substrates of a liquid crystal device in accordance with the present invention and a prior art liquid crystal device.

As an experiment, the distance between substrates of 200 mm×300 mm joined in accordance with the present invention was measured. Nine measuring points were taken on the diagonal line of the substrates with an interval of 40 mm. 10 designates the results in FIG. 3. For reference, 11 designates the corresponding distances of a device produced by a prior art process with spacers made of alumina having 2.0±0.3 microns in diameter which are distributed with methyl alcohol. As shown in FIG. 3, the distance in accordance with the invention is largely constant while the distance in accordance with the prior art is substantially scattered, and particularly is wide at the center position. In the case of the present invention, the distance is substantially not changed even when pushed with a finger. The fluctuation was only ±0.5 micron. When the invention is applied to a liquid crystal panel of 20 cm×30 cm formed with an active matrix structure having 400×1920 pixels, the distance between a pair of substrates was also kept constant.

Accordingly, finely finishing of the surface of a substrate can be dispensed with by means of provision of pillars as explained above. The cost of such finishing is higher than the price of a substrate for liquid crystal device, so that the price can be lowered by a factor of 2 to 5. Also in accordance with the invention, sealing process and spacer distributing process are implemented simultaneously. Further, spacers are prepared with an interval of 400 microns, corresponding to the interval between adjacent pixels, so that the device constructed with the spacers has resistance against external impact.

Figure 4A:
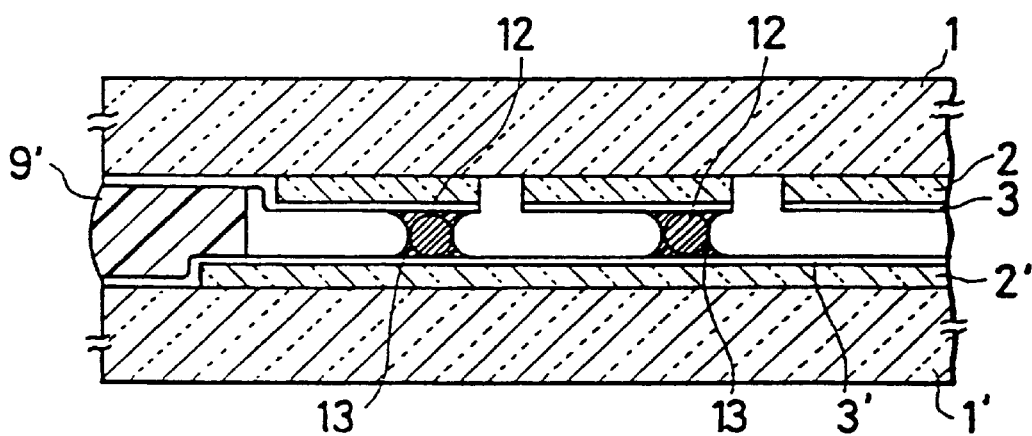
FIGS. 4(A) and 4(B) are cross section views showing modifications of devices according to the invention.
Figure 4B:
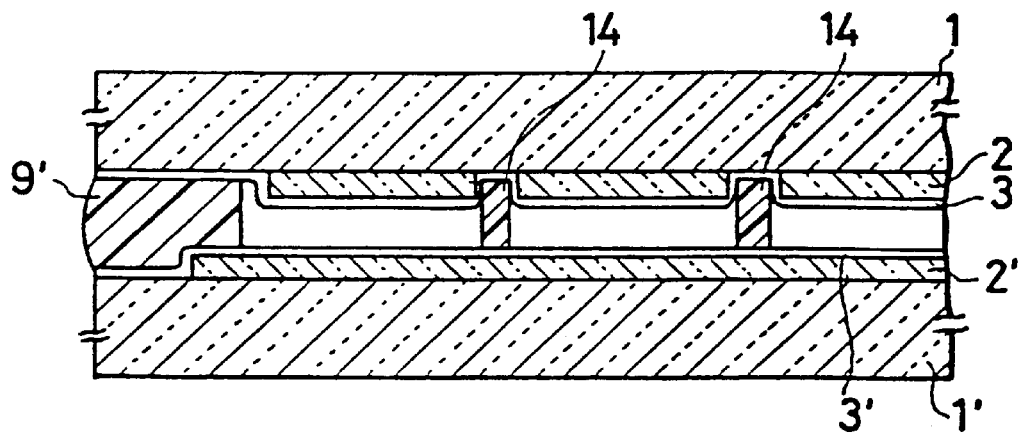

FIGS. 4(A) and (B) are cross sections showing second and third embodiments of the invention. In FIG. 4(A), pillars are formed with spheres 12 and adhesive 13 applied to the spheres for maintaining the position of the spheres on the substrates 1 and 1'. FIG. 4(B) are prepared to show the pillars 14 can be provided between adjacent electrodes.

While some embodiments are described supra, the present invention should not limited to these particular embodiments but only limited to the appended claims. Many modifications and variations may cause to those skilled in the art without departing the spirit of the invention. For example, the spacers 9 can be provided in the form of strips or blocks.

What is claimed is:

1. A liquid crystal device comprising:
    a pair of spaced apart members comprising a pair of substrates, and electrode patterns provided on said substrates respectively, at least one of said pair of spaced apart members having an orientation control film provided over one of said electrode patterns provided on one of said substrates;
    a liquid crystal layer disposed between said pair of spaced apart members;
    a sealing member provided on the perimeter of said spaced apart members; and
    a resinous block spacer disposed between said pair of spaced apart members, having an areal contact with said orientation control film at a bottom surface of said resinous block spacer, and adhering directly to said orientation control film,
    wherein said sealing member and said resinous block spacer comprise the same material, and
    wherein said orientation control film comprises a different material from that of said resinous block spacer.

2. The device of claim 1 wherein said resinous block spacer has a rectangular cross section.

3. The device of claim 1 wherein said resinous block spacer has a circular cross section.

4. The device of claim 1 wherein said resinous block spacer is apart from said sealing member.

5. The device of claim 1 wherein said sealing member and said resinous block spacer comprise an epoxy resin.

6. The device of claim 1 wherein said orientation control film comprises polyimide.

7. A liquid crystal device comprising:
    a pair of spaced apart members comprising a pair of substrates, and electrode patterns provided on said substrates respectively;
    a liquid crystal layer disposed between said pair of spaced apart members;
    a sealing member provided on the perimeter of said spaced apart members; and
    a resinous block spacer disposed between said pair of spaced apart members, having an areal contact with one of said pair of spaced apart members at a bottom surface of said resinous block spacer and adhering directly to said one of said pair of spaced apart members,
    wherein said sealing member and said resinous block spacer comprise the same material, and
    wherein said resinous block spacer overlaps with the electrode patterns provided both on said substrates.

8. The device of claim 7 wherein said resinous block spacer has a rectangular cross section.

9. The device of claim 7 wherein said resinous block spacer has a circular cross section.

10. The device of claim 7 wherein said resinous block spacer is apart from said sealing member.

11. The device of claim 7 wherein said sealing member and said resinous block spacer comprise an epoxy resin.

12. The device of claim 7 wherein the whole of said resinous block spacer overlaps with the electrode patterns provided both on said substrates.

13. A liquid crystal device comprising:
    a pair of spaced apart members comprising a pair of substrates, and electrode patterns provided on said substrates respectively, at least one of said pair of spaced apart members having an orientation control film provided over one of said electrode patterns provided on one of said substrates;

a liquid crystal layer disposed between said pair of spaced apart members;

a sealing member provided on the perimeter of said spaced apart members; and a resinous block spacer disposed between said pair of spaced apart members, having an areal contact with said orientation control film at a bottom surface of said resinous block spacer, and adhering directly to said orientation control film, wherein said sealing member and said resinous block spacer, comprise the same material, and wherein said resinous block spacer overlaps with the electrode patterns provided both on said substrates.

14. The device of claim 13 wherein said resinous block spacer has a retangular cross section.

15. The device of claim 13 wherein said resinous block spacer has a circular cross section.

16. The device of claim 13 wherein said resinous block spacer is apart from said sealing member.

17. The device of claim 13 wherein said sealing member and said resinous block spacer comprise an epoxy resin.

18. The device of claim 13 wherein the whole of said resinous block spacer overlaps with the electrode patterns provided both on said substrates.

19. A liquid crystal device comprising:

a pair of spaced apart members comprising a pair of substrates, and conductive patterns provided on said substrates respectively, at least one of said conductive patterns being transparent, a liquid crystal layer disposed between said pair of spaced apart members;

a sealing member provided on the perimeter of said spaced apart members; and a resinous block spacer disposed between said pair of spaced apart members, having an areal contact with one of said pair of spaced apart members at a bottom surface of said resinous block spacer and adhering directly to said one of said pair of spaced apart members, wherein said sealing member and said resinous block spacer comprise the same material, and wherein said resinous block spacer overlaps with the conductive patterns provided both on said substrates.

20. The device of claim 19 wherein said resinous block spacer has a rectangular cross section.

21. The device of claim 19 wherein said resinous block spacer has a circular cross section.

22. The device of claim 19 wherein said resinous block spacer is apart from said sealing member.

23. The device of claim 19 wherein said sealing member and said resinous block spacer comprise an epoxy resin.

24. The device of claim 19 wherein the whole of said resinous block spacer overlaps with the conductive patterns provided both on said substrates.

25. A liquid crystal device comprising:

a pair of spaced apart members comprising a pair of substrates, and conductive patterns provided on said substrates respectively, at least one of said pair of spaced apart members having an orientation control film provided over one of said conductive patterns provided on one of said substrates, and at least one of said conductive patterns being transparent;

a liquid crystal layer disposed between said pair of spaced apart members;

a sealing member provided on the perimeter of said spaced apart members; and a resinous block spacer disposed between said pair of spaced apart members, having an areal contact with said orientation control film at a bottom surface of said resinous block spacer, and adhering directly to said orientation control film, wherein said sealing member and said resinous block spacer comprise the same material, and wherein said resinous block spacer overlaps with the conductive patterns provided both on said substrates.

26. The device of claim 25 wherein said resinous block spacer has a rectangular cross section.

27. The device of claim 25 wherein said resinous block spacer has a circular cross section.

28. The device of claim 25 wherein said resinous block spacer is apart from said sealing member.

29. The device of claim 25 wherein said sealing member and said resinous block spacer comprise an epoxy resin.

30. The device of claim 25 wherein the whole of said resinous block spacer overlaps with the conductive patterns provided both on said substrates.

* * * * *